(12) United States Patent
Macauda

(10) Patent No.: US 11,020,848 B2
(45) Date of Patent: Jun. 1, 2021

(54) ERGONOMIC TROUGH-SUPPORT SYSTEM

(71) Applicant: Thomas P. Macauda, Downers Grove, IL (US)

(72) Inventor: Thomas P. Macauda, Downers Grove, IL (US)

(*) Notice: Subject to any disclaimer, the term of this patent is extended or adjusted under 35 U.S.C. 154(b) by 120 days.

(21) Appl. No.: 16/366,145

(22) Filed: Mar. 27, 2019

(65) Prior Publication Data

US 2019/0299395 A1 Oct. 3, 2019

Related U.S. Application Data

(60) Provisional application No. 62/649,979, filed on Mar. 29, 2018.

(51) Int. Cl.
| | | |
|---|---|---|
| *B25H 3/00* | (2006.01) | |
| *F16M 13/04* | (2006.01) | |
| *B65D 25/28* | (2006.01) | |
| *E04G 21/02* | (2006.01) | |
| *B44D 3/12* | (2006.01) | |

(52) U.S. Cl.
CPC ............... *B25H 3/00* (2013.01); *B44D 3/12* (2013.01); *B65D 25/2802* (2013.01); *E04G 21/025* (2013.01); *F16M 13/04* (2013.01); *B65D 2313/04* (2013.01); *B65D 2525/285* (2013.01)

(58) Field of Classification Search
CPC ............... E04G 17/12; E04G 21/025; B65D 2525/28; B65D 33/14; B65D 2313/04; B65D 5/5206; B65D 90/125; B65D 85/00; B65D 25/2802; B65D 2525/285; B25H 3/00; F16M 13/04; B44D 3/12; B44D 3/14; B25G 3/04; B25G 1/102
USPC .... 220/695, 697, 570, 571.1, 483, 696, 752; 211/60.1, 69.9, 100; 248/118, 110, 118.1, 248/118.3; 206/1.8, 1.9
See application file for complete search history.

(56) References Cited

U.S. PATENT DOCUMENTS

| | | | | |
|---|---|---|---|---|
| 1,823,814 A | * | 9/1931 | Aiello | A45D 42/06 |
| | | | | 132/301 |
| 2,788,153 A | * | 4/1957 | Broadbelt | B44D 3/14 |
| | | | | 220/695 |
| 4,136,805 A | * | 1/1979 | Storms | A45F 5/00 |
| | | | | 224/219 |
| 5,186,507 A | * | 2/1993 | Neidfeld | E04F 21/06 |
| | | | | 294/146 |
| 5,493,751 A | * | 2/1996 | Misiukowiec | B44D 3/126 |
| | | | | 15/257.06 |
| 5,509,169 A | * | 4/1996 | Drucker | B44D 3/126 |
| | | | | 15/257.05 |
| 5,511,279 A | * | 4/1996 | Ippolito | B44D 3/126 |
| | | | | 15/257.06 |
| 5,667,114 A | * | 9/1997 | Bourque | G06F 1/1628 |
| | | | | 224/270 |

(Continued)

*Primary Examiner* — Kareen K Thomas
(74) *Attorney, Agent, or Firm* — Cook Alex Ltd.

(57) ABSTRACT

A trough-support system includes a trough, an arm rest and a handle. In some embodiments, the body of the arm rest is designed to curve around the arm of a user. The arm rest and handle can include one or more magnetic tool holders that can hold a tool or instrument. The handle can include a strap with a magnetic tool holder that can hold a tool or instrument. Various parts of the arm rest, handle and/or strap can be made of magnetic material to hold tools.

13 Claims, 4 Drawing Sheets

(56) References Cited

U.S. PATENT DOCUMENTS

| | | | | |
|---|---|---|---|---|
| 5,913,450 | A * | 6/1999 | Runkel | B44D 3/128 |
| | | | | 220/696 |
| 6,637,792 | B1 * | 10/2003 | McCoy | E04F 21/02 |
| | | | | 220/755 |
| 6,840,415 | B1 * | 1/2005 | Sapien, Jr. | A45F 5/00 |
| | | | | 224/221 |
| 6,923,485 | B1 * | 8/2005 | Bauswell | E04F 21/02 |
| | | | | 294/3.5 |
| 9,386,872 | B2 * | 7/2016 | McDermott | A47G 23/0625 |
| 9,790,000 | B1 * | 10/2017 | Holton | B63B 32/70 |
| 10,287,060 | B1 * | 5/2019 | Kuesel | E04G 21/20 |
| 2002/0008395 | A1 * | 1/2002 | Hazelton | B44D 3/14 |
| | | | | 294/31.2 |
| 2002/0047028 | A1 * | 4/2002 | Harada | A45F 5/00 |
| | | | | 224/219 |
| 2003/0019894 | A1 * | 1/2003 | Caldana | H04B 1/385 |
| | | | | 224/165 |
| 2008/0315600 | A1 * | 12/2008 | Fischer | E04F 21/02 |
| | | | | 294/3.5 |
| 2011/0253571 | A1 * | 10/2011 | Rothbaum | H04M 1/15 |
| | | | | 206/320 |
| 2011/0290803 | A1 * | 12/2011 | Kehres | E04G 21/005 |
| | | | | 220/475 |

\* cited by examiner

ERGONOMIC TROUGH-SUPPORT SYSTEM

CROSS-REFERENCE TO RELATED APPLICATION(S)

This application claims priority benefits from U.S. provisional application Ser. No. 62/649,979 filed on Mar. 29, 2018, entitled "Ergonomic Trough-Support System". The '979 provisional application is hereby incorporated by reference herein in its entirety.

FIELD OF THE INVENTION

The present invention relates to construction equipment and, in particular, to a trough-support system with ergonomic features that enable the trough containing heavy plaster mud, cement, paint, stucco, and/or the like, to be held and balanced on the user's arm.

BACKGROUND OF THE INVENTION

Many tradespersons, including construction workers, carpenters and painters, utilize troughs to hold spreadable materials such as paint or plaster when they are in the process of applying such materials to a wall, ceiling and/or other structure. Typically, these troughs are filled and remain in the same proximity of the worker during use. As the worker moves through the process of painting or plasterwork, the worker must constantly return to the trough to refill or reapply the material to a given tool such as a paintbrush, knife, spatula or scrapper.

The time it takes to return to the trough, reapply the material and return to the work area lengthens the amount of time spent on a given project or structure. This is only made worse if the worker is painting or plastering areas that require a ladder or platform. In such cases, the worker must often descend the ladder to reach the trough and reapply the material.

In addition, carrying the tool between the trough and work surface increases the chance that material, such as paint, drips from the tool between the location of the trough and the work surface.

This process puts additional strain on the body of a worker during an already physically demanding job. The constant back and forth from the trough to the work area means more steps and repeated episodes of bending over to insert a tool into the trough. Over time, this additional strain can cause damage and pain to the joints, lower back and knees. These musculoskeletal disorders make a worker more susceptible to further injury and can prematurely end a career.

What is needed as an ergonomic trough that reduces the amount of time it takes to complete a given job while simultaneously lessening the physical strain associated with use of existing troughs.

SUMMARY OF THE INVENTION

Shortcomings of existing, troughs are overcome by a trough-support system comprising a trough; an arm rest; and a handle.

The body piece of the arm rest is designed to curve around the arm of a user. In some embodiments, the arm rest can include an attachment piece to connect to the trough and a tool holder. In some embodiments, the handle can include a grip, an attachment piece to connect to the trough and/or a tool holder. In some embodiments, the trough-support system can be configured for a right-handed or left-handed user.

In some embodiments, the arm rest and handle are attached to the trough by magnets. The magnets that attach the handle to the trough can be fixed or swivel to provide enhanced mobility and comfort.

In some embodiments, the trough-support system is configured to hold various tools via at least one hook, clip, snap system, hook-and-loop system and/or notch. In some embodiments, portions of the arm rest and handle are magnetic to hold various tools. In other or the same embodiments, magnets can be included in the tool holders. In some embodiments, the magnets can be configured to hold various tools.

In some embodiments, the handle of the trough-support system can include a strap. In some embodiments, the strap can be magnetic. In some embodiments, the strap includes a tool holder with a magnet that functions to hold various tools.

DETAILED DESCRIPTION OF ILLUSTRATIVE EMBODIMENT(S)

Figure 1:
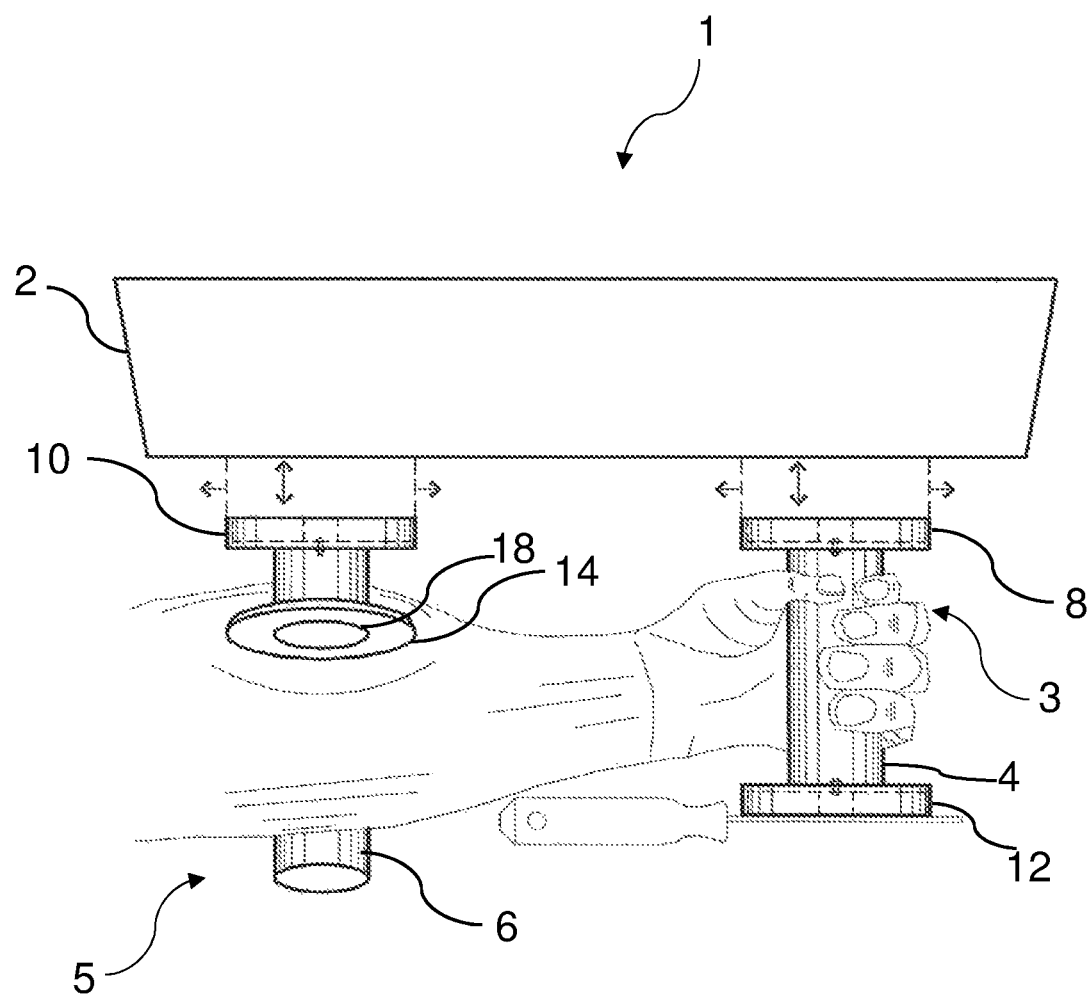
FIG. 1 is a side perspective view of a user holding an embodiment of a trough-support system.
Figure 2A:
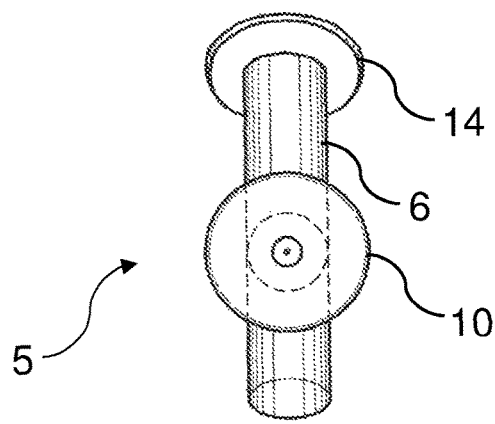
FIG. 2A is a top view of an arm rest.
Figure 2B:
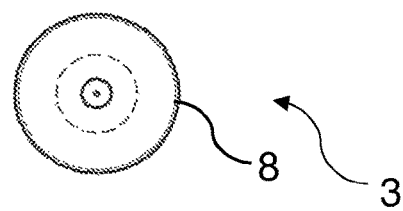
FIG. 2B is a top view of a magnetic tool plate.
Figures 3A, 3B:
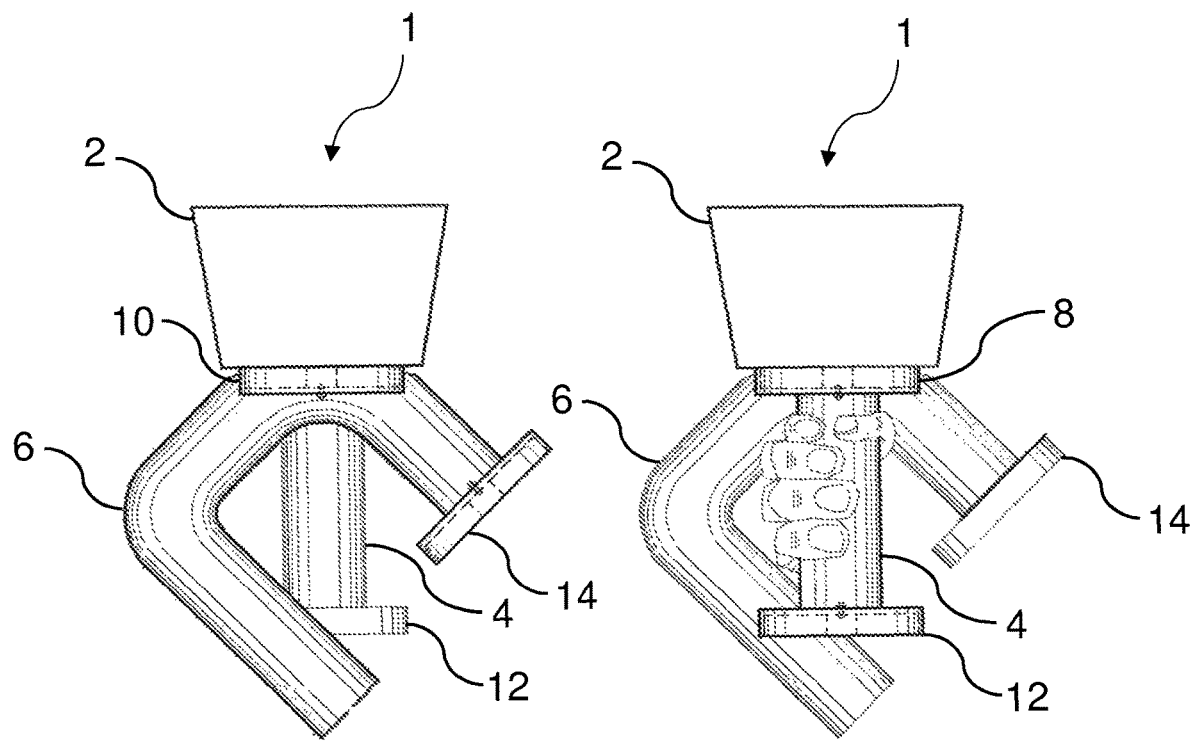
FIG. 3A is a rear view of an embodiment of a trough-support system.
FIG. 3B is a front view of an embodiment of a trough-support system.

Turning to FIG. 1, trough-support system 1 can include trough 2, handle 3 and at least one arm rest 5. In some embodiments, arm rest 5 includes cylindrical body piece 6 bent in the shape of a semi-oval such that the two interior corners of body piece 6 curve around the arm of a user of trough-support system 1.

In some embodiments, arm rest 5 also includes attachment piece 10 and tool holder 14.

Various embodiments of trough-support system 1 can be configured to distribute the weight of a material contained in trough 2, such as plaster mud, cement, paint or stucco, evenly across the length of a user's arm. For example, in the embodiment illustrated in FIG. 1, the weight of the material contained in trough 2 can be distributed such that approximately 50% of the weight rests in the area supported by handle 3 and 50% of the weight rests in the area supported by arm rest 5. This allows a user to have comfortable, balanced support of trough 2 and the material contained within while working.

In some embodiments, such as those with an additional arm rest situated between arm rest 5 and handle 3, the weight of the material contained in trough 2 can be distributed such that a third of the weight rests in the area supported by handle 3, a third of the weight rests in the area supported by arm rest 5 and a third of the weight rests in the area supported by the additional arm rest.

Handle 3 includes cylindrical grip 4, attachment piece 8 and tool holder 12. Various parts of handle 3 and/or arm rest 5 can be covered in a silicone, rubber, cloth, foam, and/or other thermoplastic elastomers for user comfort. In some embodiments, the covering is removable and/or washable. Attachment piece 10, attachment piece 8, tool holder 14 and/or tool holder 12 can be various shapes and dimensions. In the embodiments shown in FIGS. 1-4, attachment piece 10, attachment piece 8, tool holder 14 and/or tool holder 12 can be circular.

In some embodiments, attachment piece 8 and/or attachment piece 10 secure handle 3 and/or arm rest 5 to the bottom of trough 2. In some embodiments, this is accomplished by a set of threads and receiving grooves between each attachment piece and trough 2. In other embodiments, handle 3 and arm rest 5 are permanently affixed to trough 2. In some embodiments, attachment piece 8, attachment piece 10, and/or trough 2 are magnetic. The magnets that attach attachment piece 8 to trough 2 can be fixed or swivel to provide enhanced mobility and comfort.

In some embodiments, the bottom of trough 2 includes a set of tracks in which the attachment pieces can be inserted and moved laterally along the tracks to various positions. This allows a user to adjust the distance between arm rest 5 and handle 3. In some embodiments, arm rest 5 and handle 3 can be locked into place once a desired distance between arm rest 5 and handle 3 is chosen by a user.

In some embodiments, the directionality of arm rest 5 can be altered to accommodate a right-handed or left-handed user. In some embodiments, this is achieved by body piece 6 being configured to rotate within attachment piece 10. In some embodiments, this is achieved by arm rest 5 being attached to the bottom of trough 2 to accommodate a right-handed or left-hand user. In some embodiments, arm rest 5 is made of flexible material. In some embodiment arm rest 5 has at least one elbow connector to allow for adjustment of arm rest 5.

Trough 2, handle 3 and arm rest 5 can be made of conventional materials including, but not limited to, plastics, woods, rubbers, metals and/or steels.

In some embodiments, the trough of trough-support system 1 can be a drywall mud pan. The mud pan can be of various lengths including but not limited to 12", 14" or 18". In some embodiments, the drywall mud pan can be made of or include a ferromagnetic metal. In some embodiments, the drywall mud pan can be made of ferritic or martensitic stainless steel.

In some embodiments, the trough of trough-support system 1 can be a paint tray. In some embodiments, the paint tray can be made of or include a ferromagnetic metal. In some embodiments, the paint tray can be made of ferritic or martensitic stainless steel.

In some embodiments, handle 3 and arm rest 5 are configured to secure to trough 2 through magnets included on attachment piece 8 and attachment piece 10. In some or the same embodiments, the bottom of trough 2 can be made of or include a ferromagnetic metal such as, but not limited to, cobalt, iron, nickel, gadolinium, dysprosium, permalloy, awaruite, wairakite and/or magnetite.

Tool holder 12 of handle 3 and tool holder 14 of arm rest 5 can be used to hold various tools such as, but not limited to, a screwdriver, spatula, knife, broad knife, taping knife, putty knife, joint knife, mud knife, wipe down knife, scratcher knife, knock down knife, scrapper, shaver, scarifier, rasp, chisel, gimlet, hawk tool, trowel, ceramic trowel, drywall trowel, corner trowel, plaster trowel, flooring trowel, drywall trowel, scratcher trowel, float, grout float, rule, straightedge, blade and/or paintbrush. In some embodiments, tool holders can include straps, hook and loop fasteners or various other fastening mechanisms to secure tools to trough-support system 1.

In some embodiments, such as those illustrated in FIGS. 1-3, tool holder 12 and tool holder 16 include a magnetic surface, such as a magnetic coating or plating, to hold tools. In some embodiments, this allows a user to quickly remove and replace a tool as needed and help make the tools needed for a specific application, such as applying a wall plaster, readily accessible. In some embodiments, tool holder 12 includes a magnet (not shown) and tool holder 14 includes magnet 18 capable of holding various tools and instruments, as shown in FIG. 1. In some embodiments, part or all of handle 3 and/or arm rest 5 can be magnetized for tool attachment. In some embodiments, trough-support system 1 can include a plurality of connected or removable magnets and/or magnetized attachments for holding various tools. For example, another magnetized tool holder (not shown) can be attached to the distal end of body piece 6, relative to attachment piece 10, of arm rest 5 such that is rests below the arm of a user.

FIGS. 2A, 2B, 3A and 3B depict various views of trough-support system 1.

Figure 4:
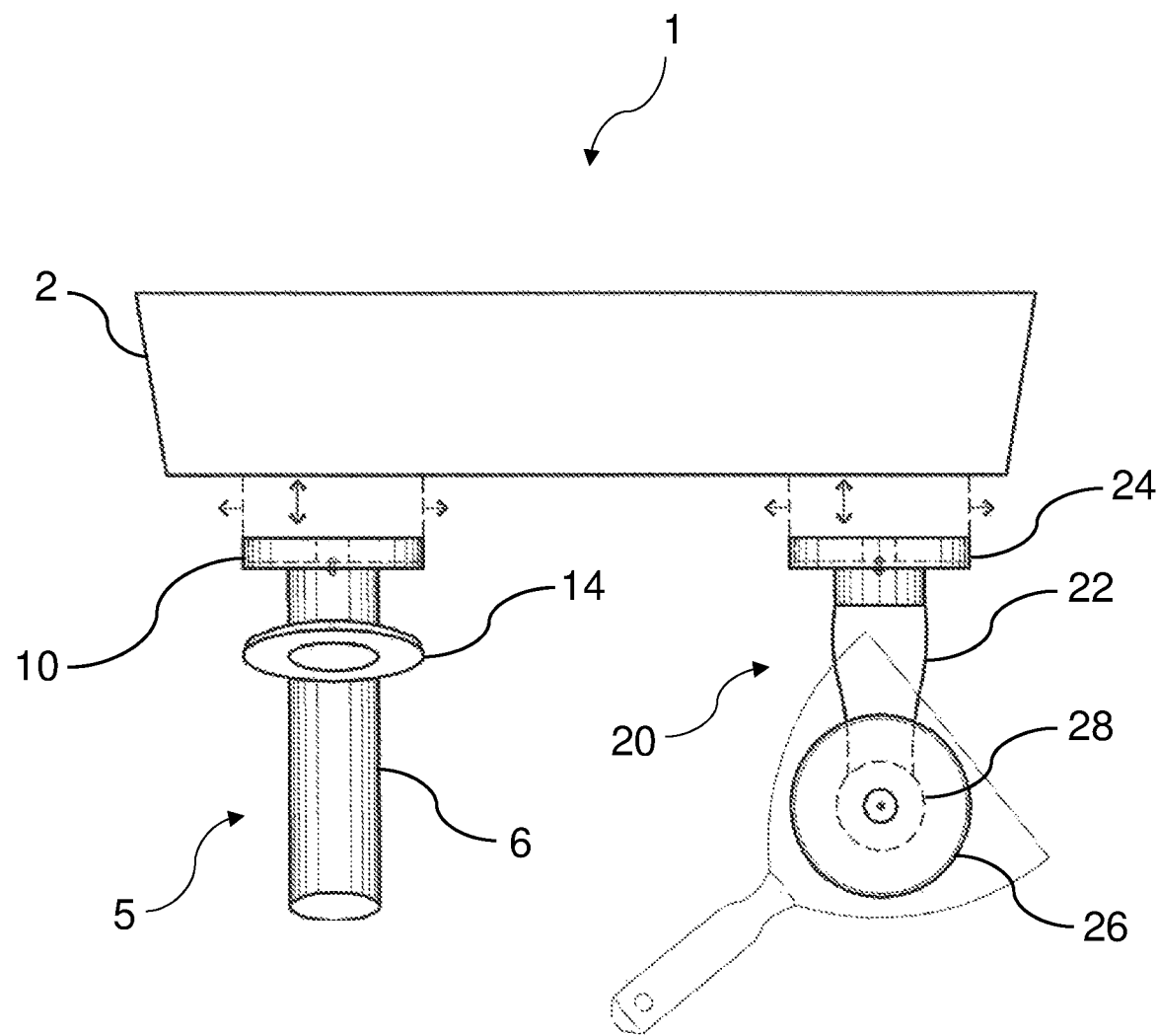
FIG. 4 is a side perspective view of an embodiment of a trough-support system.

FIG. 4 illustrates another embodiment of trough-support system 1. In this embodiment, trough-support system 1 includes arm rest 5 and handle 20. Handle 20 can include grip 22, attachment piece 24 and tool holder 26. In this embodiment, tool holder 26 can be attached to the distal end of grip 22, relative to attachment piece 24, such that tool holder 26 is parallel, rather than perpendicular, to grip 22. In some embodiments, grip 22 contains tool holder 26 with magnet 28 and an additional tool holder (not shown) affixed perpendicularly to the distal end of grip 22. Tool holders can be magnetized for tool attachment.

In some embodiments, tool holders can be configured to rotate. In some embodiments, this allows a user to spin a tool holder and access the desired portion of a tool or instrument such as its handle.

In some embodiments, a tool holder is removable and can be attached by various means to the handle of trough-support system 1 depending on a user's preference. In some embodiments, tool holders can be attached at various positions along the length of the arm rest of trough-support system 1.

Figure 5A:
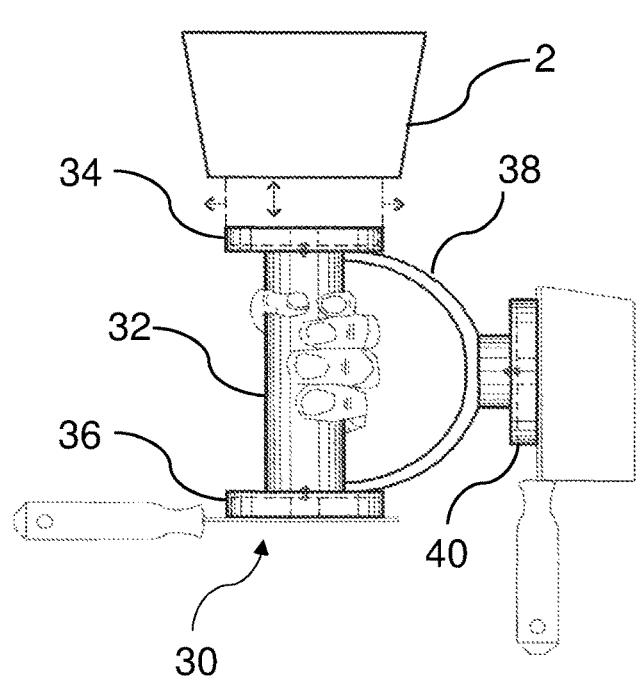
FIG. 5A is a front view of a first configuration for an adjustable-handle embodiment for a trough-support system.
Figure 5B:
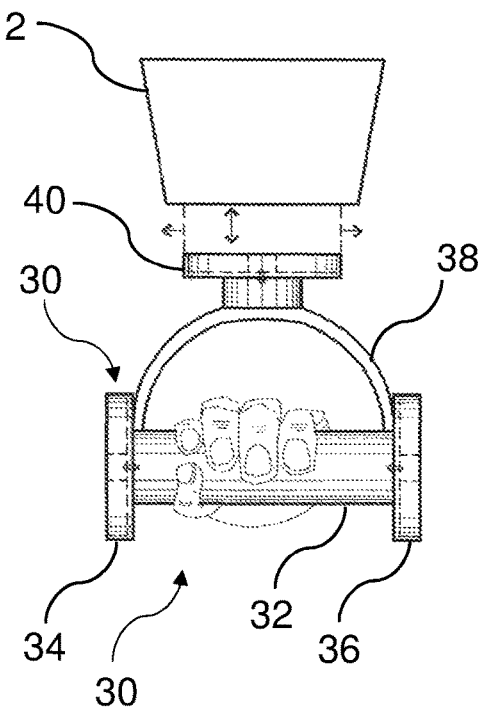
FIG. 5B is a front view of a second configuration for an adjustable-handle embodiment for a trough-support system.
Figure 6:
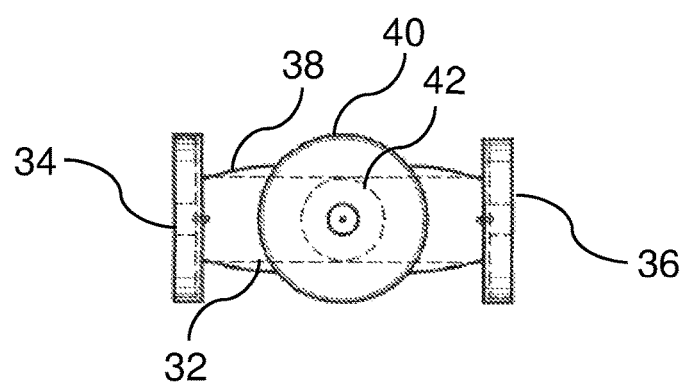
FIG. 6 is a top cutaway top view of the adjustable-handle shown in FIG. 5B.

Turning to FIGS. 5A, 5B, and 6, another embodiment of a handle for trough-support system 1 is shown. In this embodiment, handle 30 can include grip 32, multipurpose pieces 34, 36. Handle 30 also includes strap 38 with multipurpose piece 40. In some embodiments, strap 38 is removable and can be attached at various points to the distal and proximal end of grip 32.

Strap 38 can be various lengths, shapes and thicknesses. In some embodiments, strap 38 is made of or includes a ferromagnetic metal such as, but not limited to, cobalt, iron, nickel, gadolinium, dysprosium, permalloy, awaruite, wairakite and/or magnetite such that tools can be held directly by strap 38 without the use of a tool holder attachment. In some embodiments, strap 38 can accommodate multiple magnetized tool holders.

Multipurpose piece 34, multipurpose piece 36 and/or multipurpose piece 40 can be magnetized. In some embodiments, this allows a user to alter the orientation of handle 30. As shown in FIG. 5A, multipurpose piece 34 is affixed to trough 2, while multipurpose piece 36 and multipurpose piece 40 hold tools. Alternatively, as shown in FIG. 5B, handle 30 is rotated such that grip 32 is parallel to trough 2 and multipurpose piece 40 attaches to the bottom of trough 20. In this orientation, tools can be held by multipurpose piece 34 and multipurpose piece 36.

In some embodiments, handle 30 is a stand-alone apparatus that can accommodate various troughs without the need of an arm rest.

In some embodiments, a user can switch out one handle attachment of trough-support system 1 for another handle attachment.

In at least some embodiments, trough-support system 1 can be disassembled for cleaning.

Trough-support system 1 can be used to hold materials including, but not limited to, plaster and/or paint along with application tools on the non-dominant arm of a user. Trough-support system 1 can be used by tradesman for the ergonomic application of such materials to a wall, ceiling or other building structure. The easy accessibility of both the material and application tool(s) reduces the amount of time required to complete a project and lessens the amount of physical strain associated with the use of existing troughs.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A trough-support system comprising:
   (a) a trough for holding a quantity of spreadable material;
   (b) an arm rest attached to and extending downwardly from an underside of said trough; and
   (c) a handle attached to and extending downwardly from the underside of said trough, wherein said handle comprises a grip, a grip attachment piece for attaching said grip to the underside of said trough, a strap, and a strap attachment piece for attaching said strap to the underside of said trough,
   whereby positioning said arm rest on a forearm of a user and gripping said handle balances said trough on a arm of the user.

2. The trough-support system of claim 1, wherein said arm rest comprises:
   (i) a body piece configured to extend around the arm of the user;
   (ii) an arm rest attachment piece, wherein said arm rest attachment piece connects said arm rest to said trough; and
   (iii) at least one arm rest tool holder.

3. The trough-support system of claim 1, wherein said handle further comprises at least one handle tool holder.

4. The trough-support system of claim 1, wherein said arm rest and said handle are attached to said trough by magnets.

5. The trough-support system of claim 1, wherein a portion of each of said arm rest and said handle is magnetic.

6. The trough-support system of claim 5, wherein said magnetic portion of said arm rest and said magnetic portion of said handle can hold tools.

7. The trough-support system of claim 2, wherein said arm rest further comprises:
   (iv) a magnet, wherein said magnet is affixed to said at least one arm rest tool holder.

8. The trough-support system of claim 7, wherein said magnet can hold a tool.

9. The trough-support system of claim 3, wherein said handle further comprises
   a magnet, wherein said magnet is affixed to said at least one handle tool holder.

10. The trough-support system of claim 9, wherein said magnet can hold a tool.

11. The trough-support system of claim 1, wherein said strap further comprises a strap tool holder.

12. A trough-support system comprising:
   (a) a trough for holding a quantity of spreadable material;
   (b) an arm rest attached to and extending downwardly from an underside of said trough; and
   (c) a handle attached to and extending downwardly from the underside of said trough, said handle further comprising a strap, wherein said strap is magnetic;
   whereby positioning said arm rest on a forearm of a user and gripping said handle balances said trough on a arm of the user.

13. A trough-support system comprising:
   (a) a trough for holding a quantity of spreadable material;
   (b) an arm rest attached to and extending downwardly from an underside of said trough; and
   (c) a handle attached to and extending downwardly from the underside of said trough, said handle further comprising a strap, said strap further comprising a tool holder, wherein said tool holder includes a magnet and said magnet can hold a tool;
   whereby positioning said arm rest on a forearm of a user and gripping said handle balances said trough on a arm of the user.

* * * * *